United States Patent [19]

McEachern et al.

[11] Patent Number: 4,714,196
[45] Date of Patent: Dec. 22, 1987

[54] FARM CHEMICAL DELIVERY SYSTEM

[75] Inventors: Richard D. McEachern, Carrollton; Willie W. Jordan, Garland; Gerald C. Gebheim, Arlington; Joe M. Robinson, Childress, all of Tex.

[73] Assignee: AgRobotics, Inc., Childress, Tex.

[21] Appl. No.: 894,719

[22] Filed: Aug. 8, 1986

Related U.S. Application Data

[63] Continuation of Ser. No. 680,604, Dec. 11, 1984, abandoned.

[51] Int. Cl.⁴ .............................................. B05B 7/00
[52] U.S. Cl. .................................... 239/62; 239/127; 239/156; 239/159; 239/304; 239/308; 239/328
[58] Field of Search ................. 239/61, 62, 73, 74, 239/124, 127, 155, 156, 159, 303, 304, 328, 308; 137/572

[56] References Cited
U.S. PATENT DOCUMENTS
3,603,506 9/1971 Hubbs .............................. 239/328 X FOREIGN PATENT DOCUMENTS
2048091 12/1980 United Kingdom .................. 239/61

Primary Examiner—Andres Kashnikow
Assistant Examiner—Mary Beth O. Jones
Attorney, Agent, or Firm—Richards, Harris, Medlock & Andrews

[57] ABSTRACT

A fluid delivery system (10) is provided for delivering at least one chemical (26) onto a field in a desired concentration. A carrier fluid (67) is provided for diluting the farm chemical (26). The mixture is pumped through a spray boom (18) onto the field by a main fluid pump (74). The chemical (26) is delivered to the inlet port (76) of the main fluid pump (74) by a chemical pump (54). The chemical pump (54) is operated by a variable speed stepping motor (56). The speed of the stepping motor (56) is controlled by a speed sensing wheel (88) to provide a uniform concentration of chemical on the field independent of vehicle speed. The motor speed is also controlled by a thumbwheel switch (116) to deliver a desired concentration on the field compensating for drive vehicle wheel slippage. The motor speed is also adjusted to calibrate the delivery concentration to the nozzle pattern through calibration switches.

6 Claims, 7 Drawing Figures

FARM CHEMICAL DELIVERY SYSTEM

This application is a continuation, of application Ser. No. 680,604, filed 12/11/84, now abandoned.

TECHNICAL FIELD

This invention relates to the controlled delivery of chemicals, in particular to the application of farm chemicals onto farmland and the application of road chemicals along roadways.

BACKGROUND OF THE INVENTION

It is quite common to apply chemicals on a farm field for one or more purposes. The chemicals can comprise fertilizers, herbicides, fungicides or insecticides for a particular crop predator, for example. In the industry, most manufacturers recommend the application of the chemical uniformly in a quantity of pints per acre of farmland.

In the past, farmers have been forced to premix the chemical with a larger volume of water for spraying onto the farm field by a spray boom attached to a tractor. The farmer was required to calculate the flow rate of the combined chemical water mixture to approximate the density of chemical applied to the farm field. This was inconvenient. It was also inaccurate, as the tractor's speed varied.

Numerous attempts have been made to simplify the farmer's task and deliver the chemicals on a more uniform, accurate basis. U.S. Pat. No. 3,877,645, issued to Oligschlaeger on Apr. 15, 1975 discloses an example of a single tank delivery system with a single mixing tank but delivery rate controlled by vehicle speed. In devices of the type disclosed in this patent, the farmer was still required to mix the chemical and water manually.

Systems such as the device disclosed in U.S. Pat. No. 2,757,044, issued to Gerbracht on July 31, 1956, disclose use of separate chemical and water storage tanks. In the device disclosed in this patent, the water is pumped to a mixing chamber. The chemical is also pumped to the mixing chamber through separate lines by a pump operated from a cam tied directly to a drive wheel on the tractor. The chemical delivery to the mixing chamber is therefore compensated for vehicle speed.

Despite the improvements made in farm chemical delivery, a need still exists for a delivery system having greater versatility. Recent legislation requires systems to be developed which essentially eliminate farmer contact with the chemical. In certain situations, variable density of chemical deposition is desirable and simultaneous deposition of multiple chemicals at varied flow rates can also be desirable. In addition to farming, similar problems exist in the application of road chemicals along a roadway as well as other environments.

SUMMARY OF THE INVENTION

In accordance with one aspect of the present invention, a chemical delivery system for use with a farm vehicle is provided. The system includes at least one chemical storage tank for storage of a chemical. At least one delivery fluid storage tank is provided for storage of a delivery fluid. A spray boom is provided, having a plurality of nozzles for distributing the delivery fluid and chemical on a field. A main fluid pump is provided for pumping fluid from an inlet port to the spray boom for distribution on the field, the delivery fluid storage tank being in fluid communication with the inlet port for pumping of the delivery fluid. At least one chemical pump is provided for pumping the chemical at a preselected rate from the chemical storage tank to the inlet port, permitting distribution of a desired concentration of chemical on the field relatively independent of the flow rate of the delivery fluid.

In accordance with another aspect of the present invention, structure is provided for sensing the speed of the farm vehicle. The chemical pump is operated in response to the speed sensed to maintain a constant concentration of chemical distributed on the field as the farm vehicle's speed varies.

In accordance with yet another aspect of the present invention, the chemical pump is a peristaltic pump operated by a stepping motor.

In accordance with yet another aspect of the present invention, multiple chemical storage tanks are provided, each having a chemical pump associated therewith for pumping the chemical in the associated chemical storage tank into the inlet port of the main fluid pump at a preselected rate. The preselected rate for each of the chemicals is independently variable.

BRIEF DESCRIPTION OF THE DRAWINGS

A more complete understanding of the invention may be had by reference to the following Detailed Description when taken in conjunction with the accompanying drawings, wherein.

DETAILED DESCRIPTION

Figure 1:
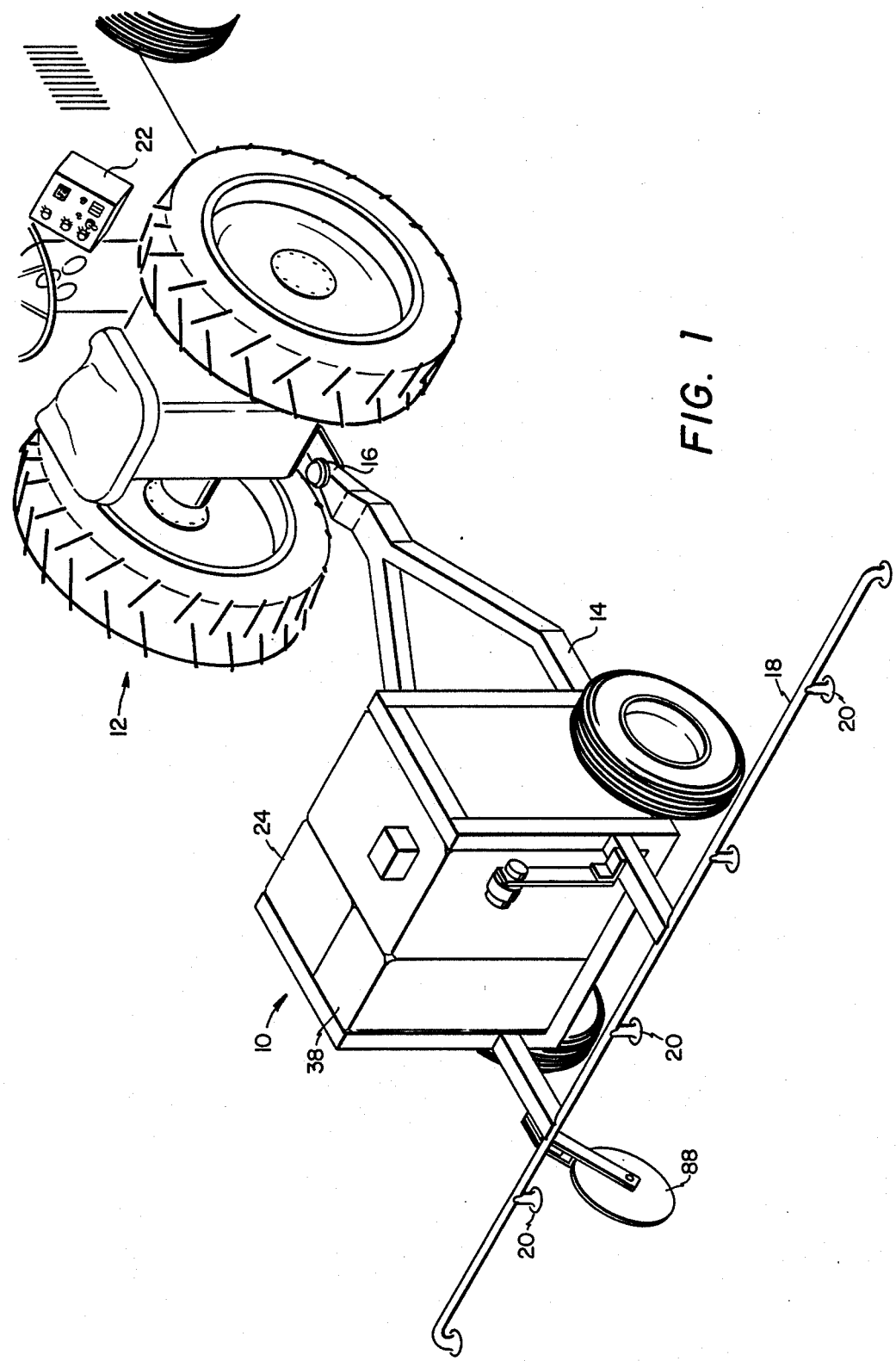
FIG. 1 is an illustrative view of the farm chemical delivery system forming one embodiment of the present invention towed by a tractor.

Referring now to the Drawings, wherein like reference characters designate like or corresponding parts throughout several views, FIG. 1 illustrates a fluid delivery system 10 forming a first embodiment of the present invention towed behind a conventional farm tractor 12. The fluid delivery system 10 illustrated is trailer mounted. However, the system can be mounted on any suitable structure, such as the tractor itself or a truck bed.

The fluid delivery system 10 is mounted on a trailer 14 which is attached to the tractor 12 by a conventional pivot hinge 16. The trailer 14 supports an elongate hollow spray boom 18 having a plurality of nozzles 20 located along its length. Pressurized fluid within the hollow center of the spray boom 18 flows through the nozzles 20 which distribute the fluid in a uniform manner over the farm field being treated. It will be understood that the spray boom and nozzle configuration may be of any type desired for a specific application. A control box 22 is mounted on the farm tractor 12 which permits the operator to readily input the desired parameters for delivery of chemicals and obtain information regarding the current status of the system.

Figure 2:
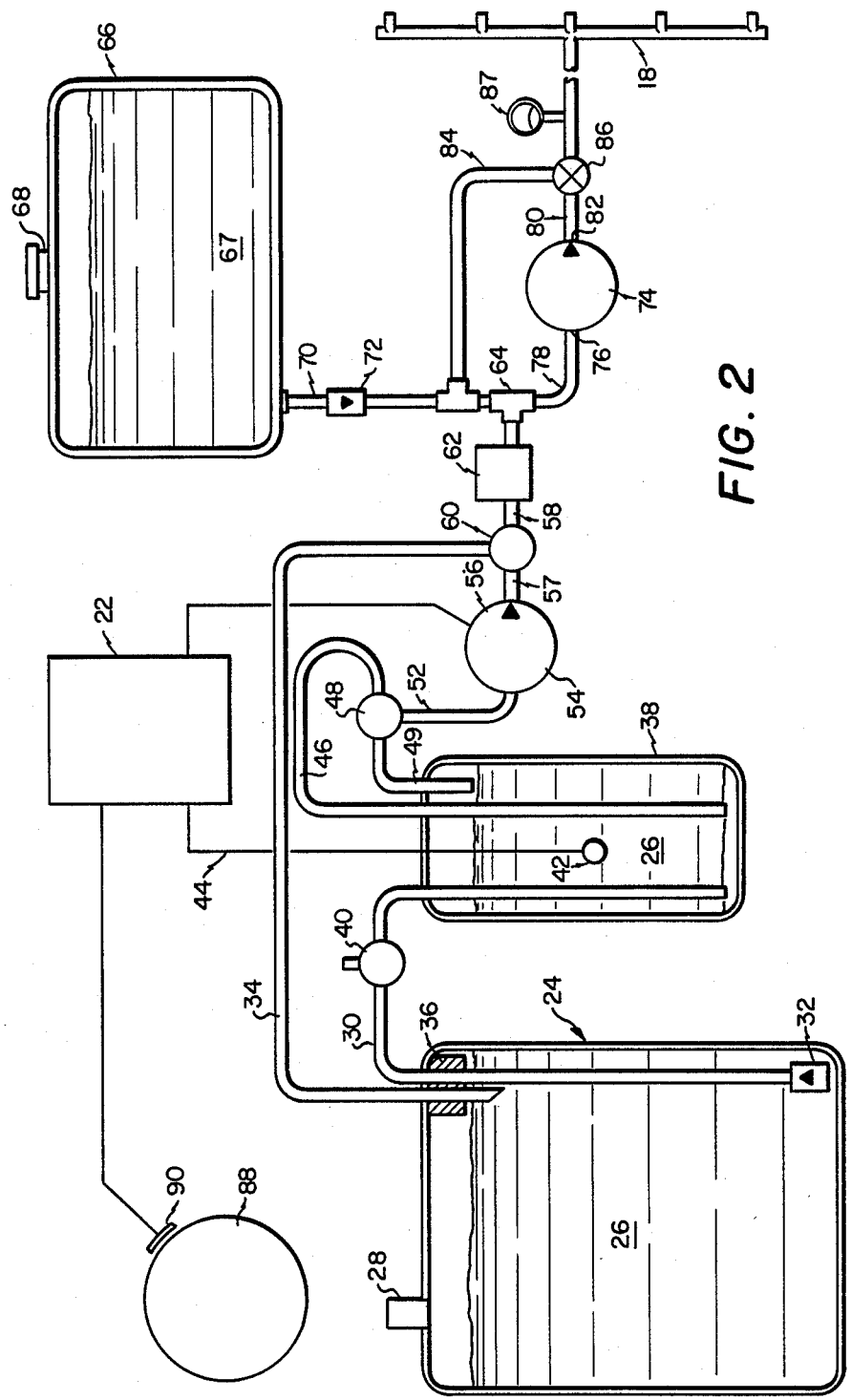
FIG. 2 is a schematic illustration of the fluid flow paths within the delivery system.
Figure 7:
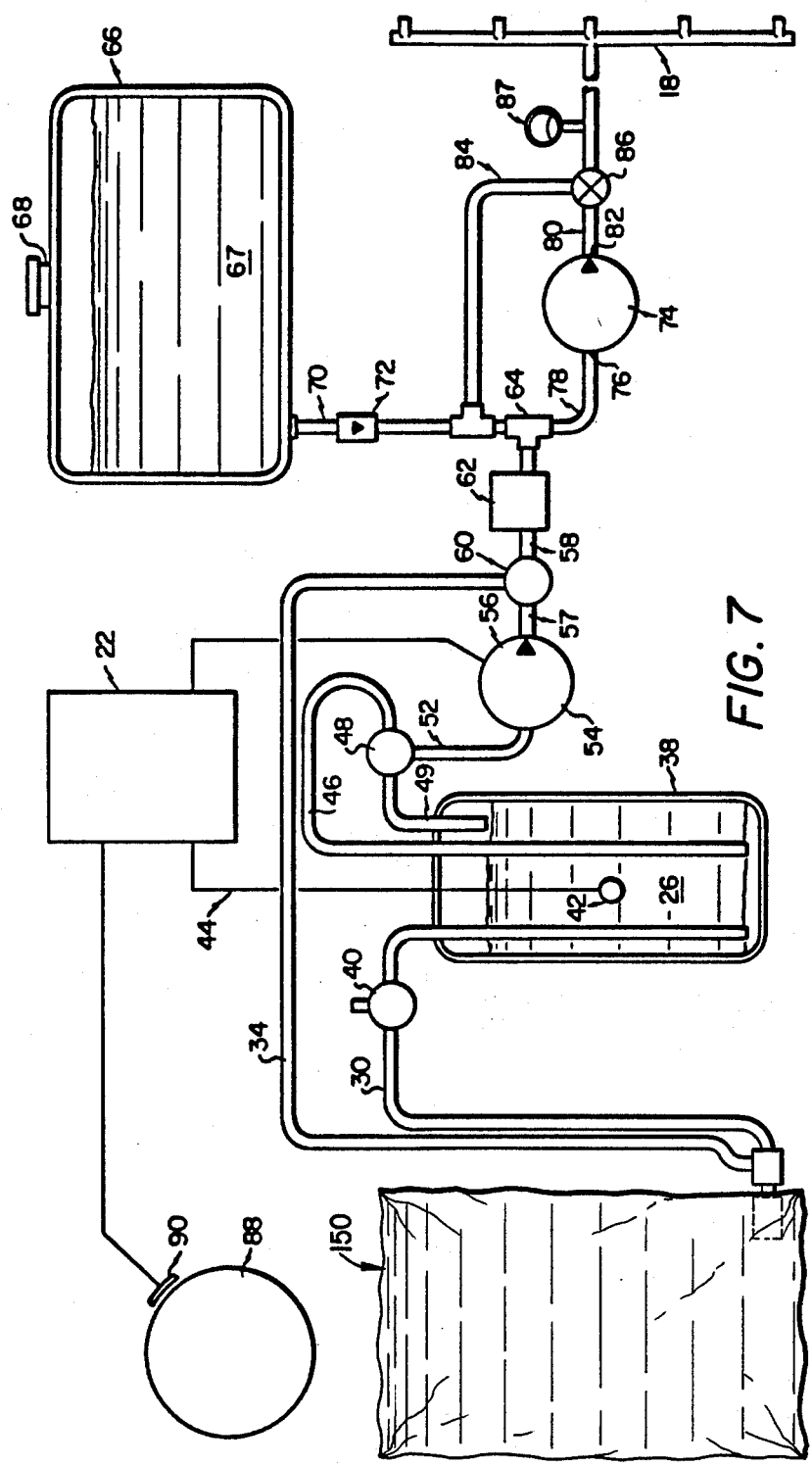
FIG. 7 is an illustrative view of a collapsible chemical storage tank for use in the present invention.

The flow path of the fluid delivery system is best described with reference to FIG. 2. A chemical container 24 is provided for holding a farm chemical 26. The farm chemical 26, may, for example, comprise a herbicide, pesticide, insecticide, or fungicide. A vent 28 is provided for venting air into the tank to prevent a vacuum in the tank. A chemical supply line 30 extends within the container 24 adjacent the bottom of the container. A check valve 32 in the supply line 30 permits chemical flow only from the container through the supply line 30. A bypass line 34 also extends into the container. A seal 36 prevents emission of the chemical 26 from container 24 other than through the lines 30 and 34. As an alternative, a nonvented collapsible container 150 can be substituted for the fixed, rigid chemical container 24 as seen in FIG. 7. This eliminates the need to vent air into the container as done by vent 28. The containers 24 and 150 are installable and removable from system 10 without operator contact with the concentrated chemical 26.

A vacuum reservoir 38 is also mounted on the trailer 14. The chemical supply line 30 enters the reservoir 38 as shown in FIG. 2. A combined shutoff and vent valve 40 is provided in the supply line 30 between the container 24 and reservoir 38 to vent the line. An electronic level sensor 42 is employed to measure the level of the chemical 26 within the reservoir 38. The measurement is transferred along a signal line 44 to the control box 22. The chemical container 24 is typically the container in which the chemical 26 is transported and stored. The fluid delivery system 10 simplifies the installation and removal of container 24 by limiting the number of connections necessary to attach the container 24. The level sensor 42 is placed in the reservoir 38 to avoid the necessity of installing and calibrating the sensor 42 everytime the container 24 is changed. The valve 40 can be used to isolate the container 24 and 38 reservoir in the shutoff position. The valve 40 can also be used to drain line 30.

A first chemical delivery line 46 extends from the lower interior of the reservoir 38 to a three-position valve 48. A second chemical delivery line 49 extends from the upper portion of the interior of the reservoir 38 to another port of the three-position valve 48. A chemical delivery line 52 extends from the third port of the valve 48 into a pump 54. Pump 54 is preferably a positive displacement type such as a peristaltic pump which operates by compressing a flexible flow line to pump the fluid through the line. A piston or syringe type pump could also be used. The pump is operated by a stepping motor 56 which provides great accuracy in the pumping rate of the chemical 26. The three-position valve 48 can be used to prime the pump 54 from the reservoir 38, and subsequently provide chemical from the reservoir for spraying on the farm field.

To prime reservoir 38 and pump 54, the valve 48 is positioned to connect lines 49 and 52. The action of the pump 54 evacuates air from reservoir 38 which draws chemical 26 into reservoir 38 from container 24. The line 49 extends only into the upper sector of reservoir 38 to draw sufficient chemical 26 into the reservoir 38 to activate sensor 42. Once the level of chemical 26 in the reservoir is set, valve 48 is set to connect lines 46 and 52 to draw chemical 26 from near the bottom of reservoir 38. The valve 48 can also be positioned to prevent flow of chemical 26 to the pump 54.

A chemical delivery line 57 extends from the output of the pump 54. A two-way valve 60 is positioned between line 57 and line 58 and is connected to the bypass line 34. The valve can be set to recycle the chemical 26 pumped to the container 24 or to move it along the delivery line 58. The valve 60 permits the chemical 26 in the reservoir 38, lines 30, 46, 49, 52 and 58 and motor 56 to be recycled into container 24 for storage. To drain these components, valve 60 is positioned to connect line 58 to return line 34. The valve 40 is opened to vent line 30 and the motor 56 operated to drain the chemical back to container 24. A pressure regulator 62 is provided in the line 58. A number of recent pesticide safety regulations, such as the regulations established by the worker health and safety unit of the California Department of Food and Agriculture requires placement of such pressure regulators in any pressurized line within a chemical delivery system. The delivery line 58 enters one port of a tee 64.

A carrier fluid tank 66 is also mounted on the trailer 14. The carrier fluid 67 can comprise water, oil or any other suitable fluid. A fill nozzle 68 is provided to fill the tank with the appropriate carrier fluid. A carrier fluid flow line 70 extends from the bottom of the tank 66 to another port in the tee 64. A check valve 72 is positioned along the delivery line 70 as illustrated in FIG. 2.

A main fluid pump 74 is mounted on the trailer 14. The inlet port 76 is connected to the third port of tee 64 by an inlet line 78. An outlet line 80 extends from the outlet port 82 of the main fluid pump 74 to the spray boom 18. A bypass loop 84 extends from a flow diverting valve 86 in the output line 80 to the delivery line 70. It will be apparent that chemical 26 and carrier fluid 67 flows into the inlet port 76 of the main pump 74. The pumping action mixes the chemical and carrier fluid to a uniform mixture for delivery to the spray boom. The flow diverting valve 86 permits bypass of the fluid flow for pressure control. A pressure gauge 87 can be employed to indicate the fluid pressure within the boom. The check valve 72 prevents contamination of the carrier fluid tank 66 by any bypass flow containing the chemical 26. There is therefore no need for a separate mixing chamber to mix the chemical and carrier fluid.

Figure 3:
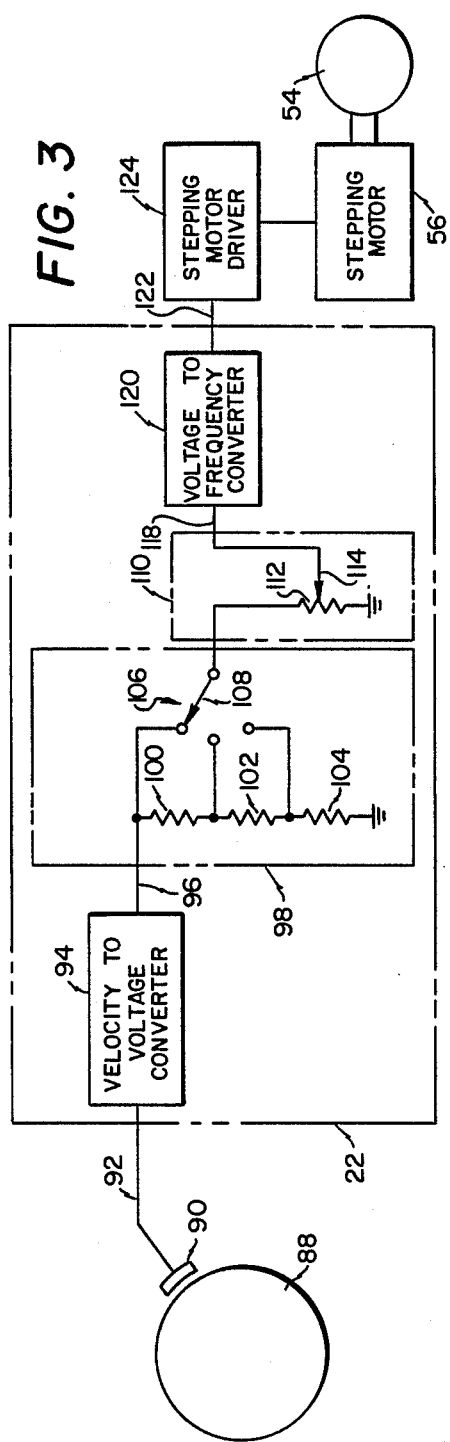
FIG. 3 is a schematic of the electronic control mechanisms in the delivery system.
Figure 4:
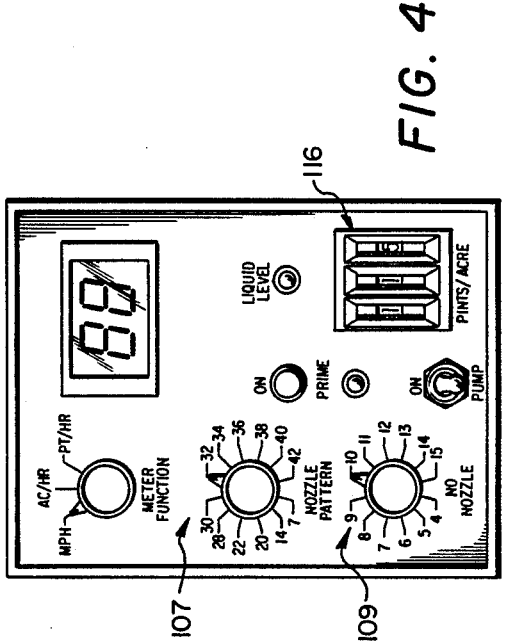
FIG. 4 is a front view of the control box with controls to set the parameters for the delivery system and readout devices for showing the current status of the delivery.

The electronic control circuitry employed in the delivery system 10 is best described with reference to FIGS. 3 and 4. A fifth wheel 88 is rotatably mounted on the trailer 14 for contact with the field surface. As the tractor 12 moves, the fifth wheel 88 rotates with a direct relationship to the distance traveled by the tractor and trailer. A sensing device 90, such as a magnetic pickup, is used on the trailer 14 to measure the rotational speed of the fifth wheel 88. The sensing device can, for example, be a Hall effect sensor. The use of a free-wheeling fifth wheel 88 has several advantages over a sensor applied to a tractor wheel on the tractor 12. When pulling a farm implement, the wheels of the tractor slip on the ground, resulting in wheel rotation independent of tractor speed. The use of the wheel 88 also permits the system to be contained on the trailer 14, eliminating the need to attach sensors to the tractor wheels and provide calibration for the tractor wheel rotation.

A signal line 92 extends from the sensing device 9 to the control box 22. The signal line 92 extends to a velocity to voltage converter 94 which acts as a tachometer.

The voltage signal generated in the converter 94 is delivered over line 96 to a range switch assembly 98.

The range switch assembly 98 consists of a series of fixed resistances, 100, 102 and 104 selectively interposable between the line 96 and ground by a multiposition range switch 106. The range switch 106 can operate to preset the system 10 for a predetermined nozzle pattern or number of nozzles. In the embodiment illustrated in FIG. 4, controls 107 and 109 are provided. Two range switch assemblies 98 would be required in series, each assembly having the switch 106 controlled by one of the controls 107 and 109 representing either the nozzle pattern or nozzle number. These controls would be found on the control box 22 and preset by the operator.

The resultant voltage from the range switch assembly 98 is transferred over a line 108 to a concentration selection assembly 110. The assembly 110 also includes a resistance 112 which extends between line 108 and ground and a wiper switch 114 which can be positioned at any point along the fixed resistance 112. The wiper switch 114 is controlled by the thumb wheel switch 116 located in the control box 22 as shown in FIG. 4. The thumb wheel switch 116 is calibrated to provide a given concentration of chemical on the farm field. In the embodiment illustrated, the concentration is given in pints of chemical per acre of farm field. The use of switch 114 permits the operator to vary the concentration of chemical applied while driving the tractor by merely resetting the switch to the desired new concentration.

The resultant voltage signal from the wiper switch 114 travels on line 118 to a voltage to frequency converter 120. The input voltage is transformed into a signal having a frequency dependent upon the input voltage. The signal from the converter 120 is transferred along a line 122 to a stepping motor driver 124. The driver 124 operates the stepping motor 56 to pump a desired quantity of chemical with the pump 54.

It can readily be seen that the fluid delivery system 10 is capable of delivering a desired concentration of chemical on a farm field relatively independent of the flow of the carrier fluid 67. This is possible since the amount of chemical entered into pump 74 is completely determined by the action of pump 54. The chemical concentration delivered is therefore also relatively independent of the nozzle configuration on the spray boom 18. Therefore, even if one or more nozzles 20 become worn, accuracy is not affected. The system 10 also eliminates the necessity to calibrate a given delivery system to a given spray boom nozzle flow rate.

The delivery of the premeasured chemical 26 to the inlet port 76 of the main fluid pump 74 permits the chemical pump 54 to be a relatively low pressure pump. This permits much greater accuracy in the small quantities of chemical needed to provide the typical concentration required on the field.

Figure 5:
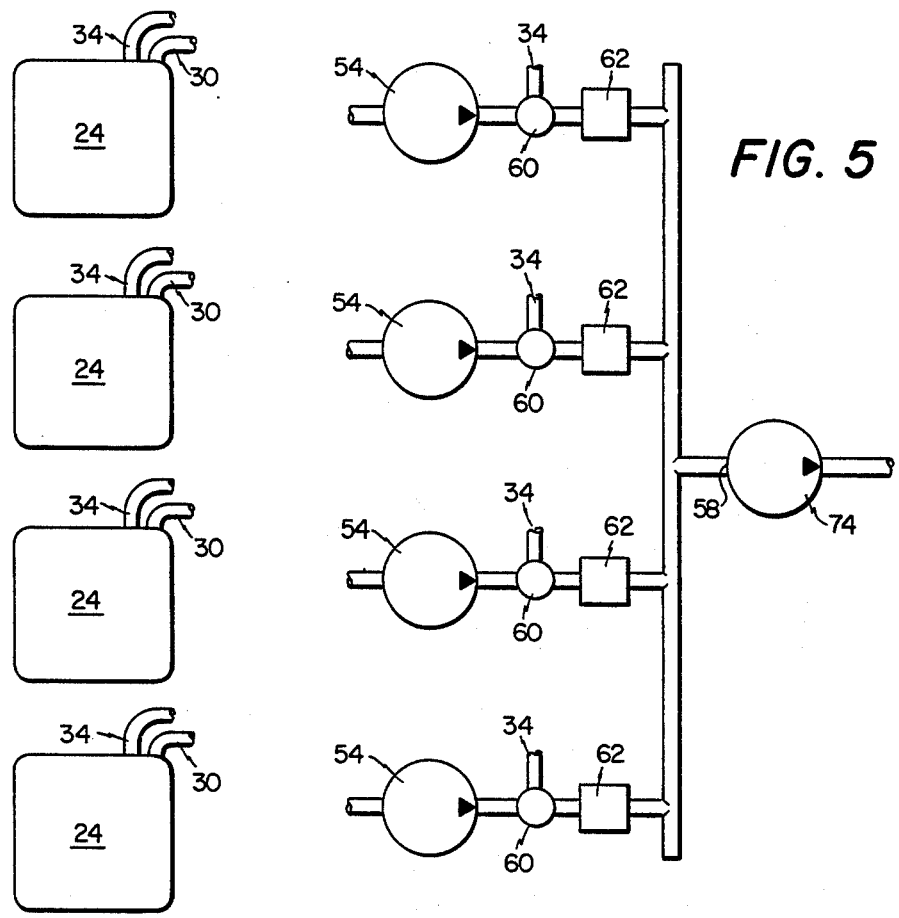
FIG. 5 is a schematic illustration of the farm chemical delivery system for multiple chemical delivery which employs multiple independent chemical containers and chemical pumps.
Figure 6:
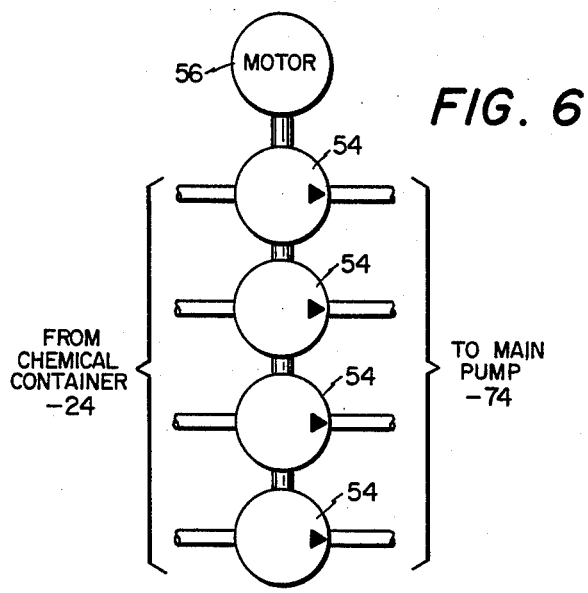
FIG. 6 is a schematic illustration of the farm chemical delivery system for multiple chemical delivery where the chemical pumps are powered by a common motor shaft of a single motor.

The fluid delivery system 10 also provides other significant advantages. If multiple chemical delivery is desired, any number of independent chemical containers and chemical pumps can provide diverse chemicals at totally independent flow rates to the inlet port 76 of the main fluid pump 74 a shown in FIG. 5. The chemical pumps may be completely independent, or, in the alternative, multiple peristaltic pumps can be provided on the motor shaft of a single stepping motor 56 to provide multiple chemicals at a fixed ratio to the inlet port 76 as seen in FIG. 6.

The container 24 containing the chemical 26 provides several advantages. Under current regulations, a container having only undiluted chemical can be resealed if the chemical is not completely used. Also, the container does not need to be washed out to remove the last chemical residual. However, if desired, the bypass line 34 can be used as a washout line to wash the container 24.

If desired, multiple delivery systems 10 can be employed with a single tractor 12. The booms on the systems 10 can extend perpendicular to the motion of the tractor and on either side of the tractor to provide more accurate concentration delivery during turns, where the outside boom coverage is required to cover the farm field at a faster rate than the inner boom.

In summary, the delivery system 10 provides a highly accurate delivery sytem which can be adapted to a particular tractor 12 or farm vehicle without extensive calibration. The control box 22 mounted on the tractor will provide the ability to the operator to select and vary the concentration of chemical on the field.

Although a single embodiment of the invention has been illustrated in the accompanying drawings and described in the foregoing Detailed Description, it will be understood that the invention is not limited to the embodiment disclosed, but is capable of numerous rearrangements, modifications and substitutions of parts and elements without departing from the spirit of the invention.

We claim:

1. A chemical metering system for delivering chemicals to a spray apparatus for dispensing chemical spray from a moving vehicle, said metering apparatus delivering said chemicals at a constant preselected application rate, the spray apparatus having a main fluid pump pumping carrier fluid from a carrier fluid supply along a carrier fluid flow path to a nozzle system, the chemical metering system comprising:

at least one chemical supply tank;

at least one positive displacement chemical metering pump communicating with said supply tank for continuously delivering chemicals from the chemical supply tank to the carrier fluid flow path upstream of the nozzle system;

a ground speed sensing means for measuring vehicle ground speed;

a control module which includes motor control circuit to vary the speed of the chemical metering pump responsive to the vehicle speed sensed by the vehicle ground speed sensing means, and responsive to the operator inputs for the width of spray swath and the rate of chemicals to be dispensed per unit area of the terrain to maintain the preselected application rate;

said control module controlling the speed of the chemical metering pump in response to the width of spray swath and the speed sensing means generating a voltage signal related to ground speed, the control module having at least one range switch means for setting the width of spray swath, said range switch means being connected to a first resistance means for modifying the voltage signal from the speed sensing means transmitted to the chemical metering pump, said control module further having a concentration selector assembly for operator selection of the desired rate of chemical to be delivered to the ground, the concentration selector assembly having a second resistance means for further modifying the voltage signal from the ground speed sensing means in response to the selection of the desired rate, the control module and speed sensing means controlling the rotation of the chemical metering pump to permit the desired rate of chemical to be delivered to the ground independent of vehicle speed and carrier fluid flow, the range switch means for setting the width of spray swath permitting the chemical delivery system to be used with diverse nozzle configurations without recalibration of the speed sensing means and concentration selector assembly.

2. The chemical metering system of claim 1 wherein the chemical supply tank comprises a nonvented collapsible vessel to provide operator safety and environmental protection.

3. The chemical metering system of claim 1 wherein said system further includes a chemical purge tank and valve system, said chemical purge tank and valve system communicating with said supply tank and chemical metering pump, wherein said chemical purge tank and valve system comprises a container with a float switch adjusted to control the module to signal a drop in the chemical level within the purge tank prior to the purge tank being completely emptied, the valve system having means returning unused chemical in the purge tank at completion of delivery to the chemical supply tank.

4. The chemical metering system of claim 1 wherein the motor control provides circuit calibration independent of the spraying apparatus.

5. The chemical metering system of claim 1 further including:

multiple chemical supply tanks, each for carrying a chemical on the vehicle separate from other chemicals;

multiple chemical purge tanks, each of said chemical purge tanks being in fluid communication with one of said chemical supply tanks for permitting the chemical in the supply tank to enter the chemical purge tank;

multiple positive displacement chemical metering pumps, each of said chemical metering pumps being connected to one of said chemical purge tanks so that a chemical can flow from the purge tank to the inlet of the chemical metering pump, the discharge of each of said positive displacement chemical metering pumps being delivered to the carrier fluid flow path of the spray apparatus, each of said chemical metering pumps delivering a continuous flow of chemical to the carrier fluid flow path at a rate determined by the rotational velocity of the chemical metering pump;

the control module encompassing multiple motor control circuits, each of said motor control circuits to vary the speed of one of said chemical metering pumps responsive to the vehicle speed sensed by the vehicle ground speed sensing means, and responsive to the operator inputs for the width of spray swath and the rate of chemical to be dispensed per unit area of the terrain to maintain the preselected application rate for each chemical.

6. The chemical metering system of claim 1 wherein said motor control circuit drives a plurality of parastaltic pumps to pump chemicals from multiple storage devices at equal flow rates.

* * * * *